United States Patent
Achhammer

(10) Patent No.: US 6,582,217 B1
(45) Date of Patent: Jun. 24, 2003

(54) PROCESS AND DEVICE FOR THE MANUFACTURE OF HOLLOW PLASTIC BOTTLES

(75) Inventor: Karl-Heinz Achhammer, Wörth/Donau (DE)

(73) Assignee: Krones AG, Neutraubling (DE)

( * ) Notice: Subject to any disclaimer, the term of this patent is extended or adjusted under 35 U.S.C. 154(b) by 0 days.

(21) Appl. No.: 09/423,254

(22) PCT Filed: Jun. 9, 1999

(86) PCT No.: PCT/EP99/03973

§ 371 (c)(1),
(2), (4) Date: Nov. 3, 1999

(87) PCT Pub. No.: WO99/64220

PCT Pub. Date: Dec. 16, 1999

(30) Foreign Application Priority Data

Jun. 10, 1998 (DE) ............................. 198 25 874

(51) Int. Cl.⁷ .............................................. B29C 49/42
(52) U.S. Cl. .................... 425/526; 425/534; 264/538
(58) Field of Search ............... 425/526, 534; 264/535, 537, 538; 198/478.1, 803.7, 803.12

(56) References Cited

U.S. PATENT DOCUMENTS

| | | | | |
|---|---|---|---|---|
| 4,082,175 A | * | 4/1978 | Gibbemeyer | 198/377 |
| 4,299,549 A | * | 11/1981 | Suzuki et al. | 425/214 |
| 4,352,424 A | * | 10/1982 | Ichizawa et al. | 198/482 |
| 4,572,355 A | * | 2/1986 | Hunter | 198/803.12 |
| 4,693,375 A | | 9/1987 | Schweers | |
| 5,116,217 A | * | 5/1992 | Doudement et al. | 425/534 |
| 5,857,562 A | * | 1/1999 | Evrard | 198/850 |

FOREIGN PATENT DOCUMENTS

| | | |
|---|---|---|
| DE | 3109267 | 1/1982 |
| EP | 060 521 | 9/1982 |
| EP | 396 482 A | 11/1990 |
| GB | 2074496 | 11/1981 |

OTHER PUBLICATIONS

German language brochures, IPT (Industreille Produktions Technik), IPT Weinfelden AG, Weinfelden, Switzerland, 3 sheets (Illustrations are of interest).

* cited by examiner

*Primary Examiner*—James P. Mackey
*Assistant Examiner*—Donald Heckenberg
(74) *Attorney, Agent, or Firm*—Marshall, Gerstein & Borun

(57) ABSTRACT

A process and a device for the manufacture of hollow plastic bodies, particularly of plastic bottles, in which plastic molding blanks are guided, by means of a shuttle system with at least one guide rail, through a tempering station, and are brought to a temperature which is suitable for extension blowing, whereby the plastic molding blanks are turned in their spatial orientation, by means of the shuttle system, through the twisting or curving of the at least one guide rail along the transport path.

22 Claims, 3 Drawing Sheets

PROCESS AND DEVICE FOR THE MANUFACTURE OF HOLLOW PLASTIC BOTTLES

FIELD OF THE INVENTION

The invention relates to a process and a device for the manufacture of hollow plastic bodies, particularly of plastic bottles.

BACKGROUND OF THE INVENTION

In the production of hollow plastic bodies, such as PET bottles, for example, so-called 'plastic molding blanks' (pre-forms), which are brought to their definitive shape during the course of the process, are used. Such types of plastic molding blanks are generally cylindrical hollow bodies which are closed at one end, and which are formed by means of injection molding, for example. These molding blanks are conveyed to a tempering station, in which they are heated to the temperature which is necessary for the following extension blowing process. During this extension blowing process, the hollow plastic body is then produced with its definitive shape.

A process of this type is described in the European patent document EP 0060 521, for example. In that document, the molding blanks are transported suspended on shuttle units along a guide rail with their apertures directed upwardly. The guide rail guides them through the tempering station and the blowing forming station.

During the manufacturing process, however, it may be desirable if the spatial orientation of the molding blanks can be changed. It can be advantageous if the molding blanks are oriented with their apertures directly downwardly, such as in the tempering station, for example.

A turning device in which the plastic molding blanks are transported in carrier units, which have a mechanism that makes a turning of the plastic molding blanks possible, is correspondingly described in the German patent document DE 31 09 267 C2. For this purpose, each carrier unit is provided with a toothed gear, the one component of which is moved by means of a link guide unit along the transport path in such a manner that the plastic molding blank is turned by means of the toothed gear on the second part of the toothed gear. Such a device therefore requires a corresponding toothed gear in every carrier unit, and can thus only be produced at a great expense.

Other known devices for the manufacture of the hollow plastic bodies have gripping devices which transfer the plastic molding blanks from one transport device to the next one, and thereby change their spatial orientation. This is also relatively expensive.

SUMMARY OF THE INVENTION

The task of the present invention is to describe a process and a device with the help of which it is possible, in a simple way and manner, to change the spatial orientation of the plastic molding blanks.

In the process in accordance with the invention, the plastic molding blanks are turned in their spatial orientation, by means of a shuttle system, through the twisting or curving of at least one guide rail along the transport path. The device in accordance with the invention additionally has at least one correspondingly twisted of curved guide rail.

With these characteristics, it is possible to change the spatial orientation of the plastic molding blanks in a simple manner. A twisting or curving of the guide rail makes a changing of the spatial orientation possible without the molding blanks having to leave the shuttle system. The changing of the orientation of the plastic molding blanks takes place rapidly and precisely, and without the stressing of the molding blanks. Expensive gripping mechanisms or the like are not required.

In accordance with one advantageous configuration, the at least one guide rail is twisted or curved in such a manner that the plastic molding blanks are, before being admitted into the tempering station, turned into an upside down position, that is to say, with their apertures directed downwardly, so that they are transported in the tempering station with their apertures directed downwardly. Immediately after the tempering station, the molding blanks can again be brought, in a second twisting- or curving area, into their original suspended position, with their apertures directed upwardly.

The molding blanks can be transferred directly from a conveying rail to the shuttle system. A transfer wheel with accommodation pockets can also be provided, however. Such a transfer wheel brings the plastic molding blanks to that distance which corresponds to that spacing distance which is defined by the individual slide units in the shuttle system.

After passing through the tempering station, the molding blanks can be conveyed directly from the shuttle system to the blowing wheel of the extension blowing station. The intake star unit, which then transfers them to the blowing wheel at a defined distance, could also be inserted here.

In another configuration, the molding blanks can also be guided by the shuttle system through the blowing station, so that no transfer to another means of transport is necessary at the intake into the blowing station.

Inside the extension blowing station, the plastic molding blanks must have a greater distance than they do in the tempering station, in order to create space for the definitive expansion of the individual hollow plastic bodies which comes about during the extension blowing process.

This can be achieved, in a simple manner, through the fact that the distance of the individual slide units of the shuttle system is increased after passing through the tempering station.

For the purpose of driving, the slide units of the shuttle system may have projections or tongue units with which a drive device can engage, for example. With the help of the driving device, the slide units can be moved along the guide rail by means of these tongue units. It can thereby be sufficient to provide one single stationary driving device which moves each slide unit that is passing by, through which the slide units which are positioned next to one another are moved further along in a downstream direction. It is also conceivable, however, to carry out the driving by means of friction wheels or friction straps which engage on the slide units, and move these further along by means of a friction engagement. A driving by means of gravity is also possible.

In order to achieve a uniform tempering of the plastic molding blanks within the tempering station, it is advantageous if these are rotated around their longitudinal axis. In the device in accordance with the invention, this can be achieved, in a simple manner, through the fact that the slide units have holding devices for the plastic molding blanks which are supported in a rotatable manner, and which can be rotated around an axis which is directed perpendicularly to the direction of forward movement. A rotation around this axis can be brought about, in a simple manner, through the engagement of a stationary projection with the driving tongue units of the individual slide units. A rotational driving by means of friction would, however, likewise be possible.

One implementation of the machine as a whole which is particularly economical in terms of space is provided if the tempering station and the extension blowing station are, in the manner as known per se, positioned above one another, and thus at different levels. The change in the spatial levels which is thereby necessary can easily be achieved by means of a corresponding curved course of the guide rail immediately following the tempering station.

The molding blanks can be held on the slide units, such as by means of clamping elements, for example. It is particularly advantageous, however, if the molding blanks are held on the slide units with the help of a mandrel which engages with the aperture of the individual plastic molding blanks by means of a friction engagement.

The molding blanks can be applied to this mandrel with the help of an attaching mechanism.

One form of implementation provides that the distance of the mandrel from the guide rails can be altered against a spring force.

The mandrel can, in this manner, be first brought closer to the guide rail, such as by means of a corresponding link guide unit, for example, and, in order to accommodate a plastic molding blank, then be further removed from the guide rail, by means of a spring resistance, in order to engage with the aperture of the plastic molding blank.

One such configuration makes a rapid and precise assumption of the plastic molding blanks by the slide units possible.

The slide units can, however, also comprise detachable accommodation elements which are, together with the plastic molding blanks, transferred to the blowing wheel and are, after the extension blowing process, removed from the plastic molding blanks and connected to the slide units again.

BRIEF DESCRIPTION OF THE DRAWINGS

The invention will now be illustrated in further detail in the following by means of the diagrams, which represent one form of implementation of the device in accordance with the invention.

These depict the following.

DETAILED DESCRIPTION OF THE PREFERRED EMBODIMENT

Figure 1:
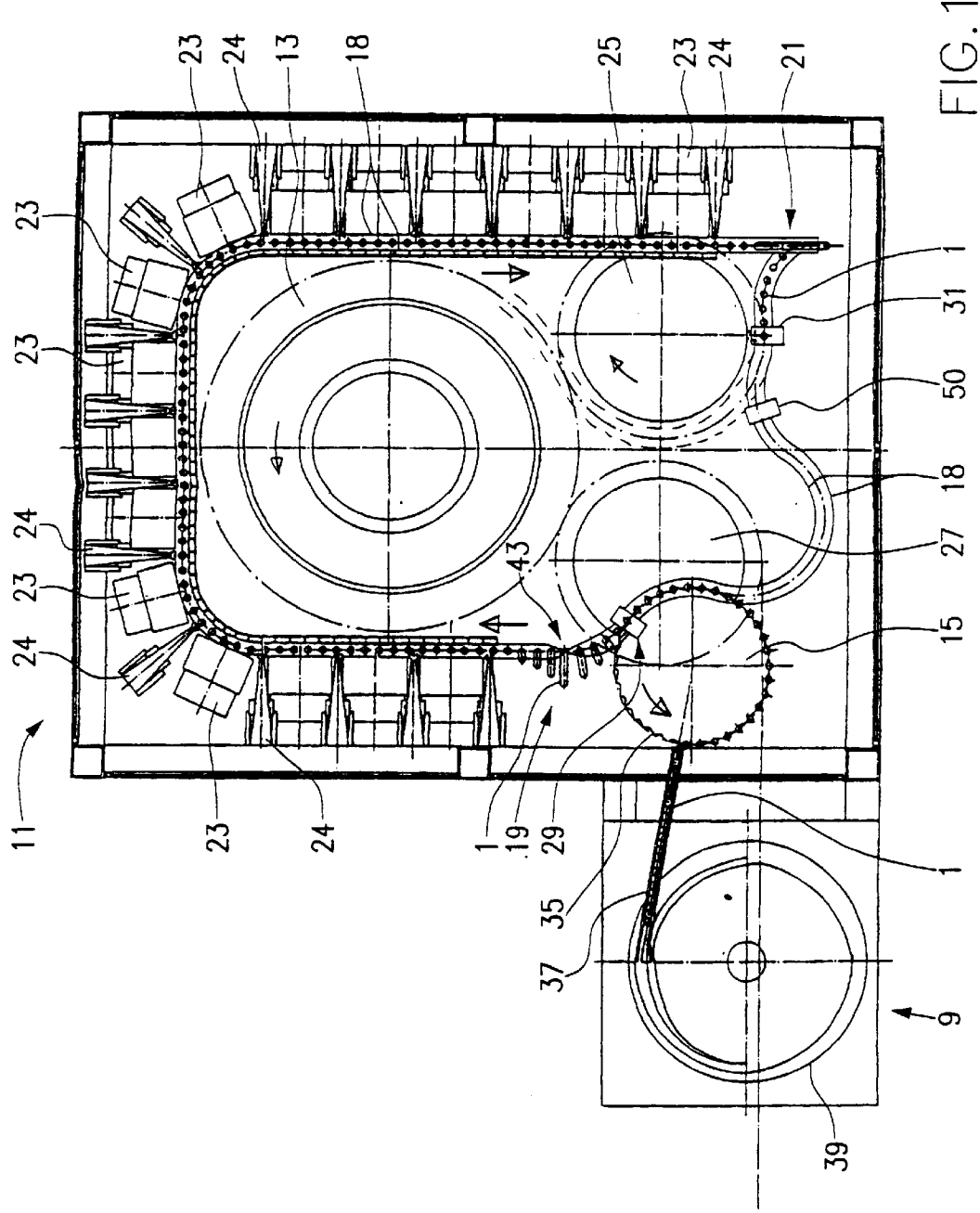
FIG. 1. A schematic view from above of a device in accordance with the invention.

A machine for the manufacture of plastic bottles is represented, in a schematic view from above, in FIG. 1.

It comprises a conveying station (9), a tempering station (11) and a blowing station with a blowing wheel (13) positioned beneath the same.

Figure 4:
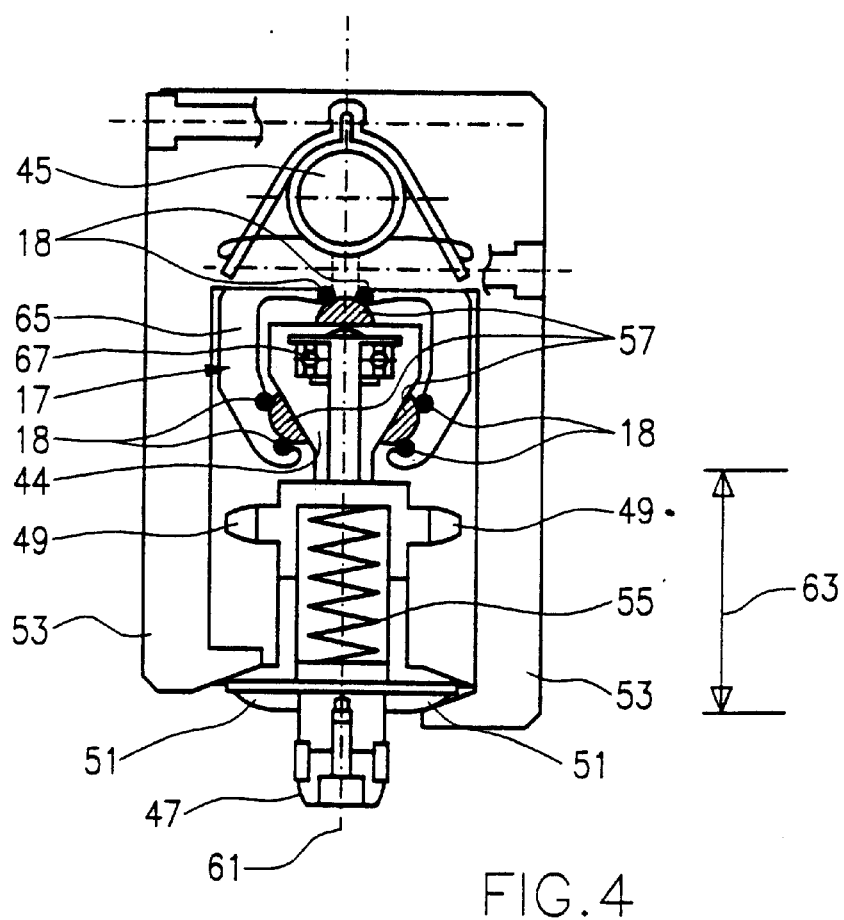
FIG. 4. A plastic molding blank.

Inside the conveying station, plastic molding blanks (1), of the type depicted in FIG. 4, for example, are transferred to a conveying chute (37), by means of a conveying wheel (39) which can be constructed in the known manner, and are suspended on the collar (5) of the same. This conveying chute (37) leads to a transfer wheel (15), which has accommodation pockets (35) on its external periphery which are adjusted to the diameter of the plastic molding blanks (1), and can likewise support these on the collar (5). A first transfer area (29) serves for the transfer of the plastic molding blanks (1), to a shuttle system (43), which will be discussed in further detail further below. Inside this transfer area (29), the slide units (44) of the shuttle system approach the transfer wheel (15) from above, and follow the external circumference of the transfer wheel, which rotates in the direction of the arrow.

Figure 2:
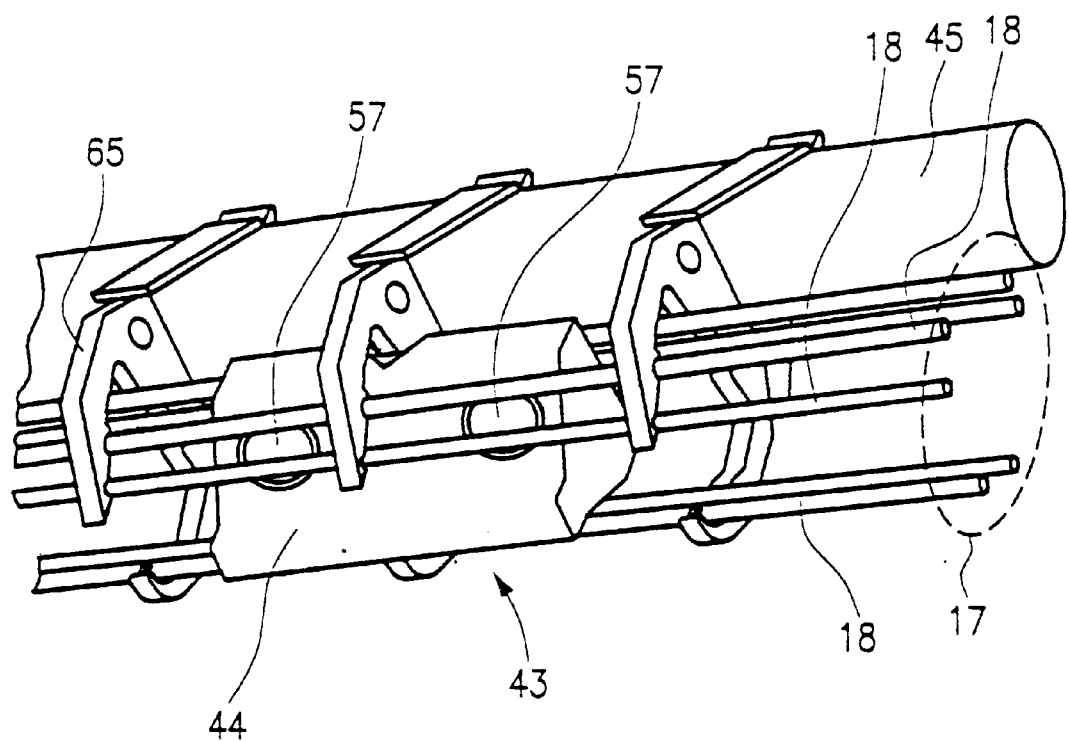
FIG. 2. A perspective representation of one section of a path with a slide unit, for the illustration of the fundamental construction.

FIG. 2 depicts, in a cut-away section, the fundamental construction of a shuttle system (43) which can be used for the embodiment of the invention. Systems of this type are already known per se, and are manufactured by the Swiss firm IPT Weinfelden AG, for example. The individual slide units (44), only one of which is depicted here, move next to one another within a cage (17) which is formed by the guide rails (18). The guide rails (18) are supported on a tubular carrier (45) by means of essentially U-shaped holding units (65). The individual slide units have ball bearings (57), so that they can roll within the cage (17).

For use in accordance with the invention, the slide units (44) are further formed, differently than as depicted in FIG. 2, in such a manner that they can accommodate and hold the molding blanks (1). This is evident, in individual terms, from FIG. 3. A mandrel (47), the external diameter of which essentially corresponds to the internal diameter of a plastic molding blank (1), is positioned on the slide unit (44) which is depicted there in a vertical section. This mandrel is attached to the slide unit (44) by being subjected to stress by means of a spring (55). Driving tongues or tooth units (49) extend in a lateral direction. The holding device, which comprises the elements (47, 49, 55), is attached to the slide unit (44), inside a support bearing (67) and rotatable around the axis of rotation (61).

Figure 3:
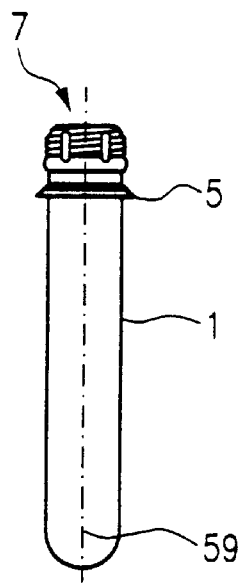
FIG. 3. A slide unit which can be used in accordance with the invention, in a cut-away, vertical view, viewed in the direction of transport within the transfer area.

A stationary spacing link (53), which cooperates with the limit stop (51) belonging to the holding device, is additionally depicted in FIG. 3. The spacing link (53) is thereby constructed within the transfer area (29) in such a manner that, when the slide unit (44) proceeds perpendicularly to the level of the figure, the distance (63) is first shortened by the length of the mandrel (47) and thereupon enlarged again. Such a type of spacing link is also provided within the second area (31) for the transfer of the plastic molding blanks to the intake star unit (25).

Drive units (50), which are positioned in the transfer area (29), in order to move the slide units forward through the tempering station (11) and up to the turning area (21), cooperate with the driving tongue units (49). Since the slide units (44) are moved, from the transfer area (29), through the tempering station (11) and up to the turning area (21), directly adjacent to one another, a single drive unit (50) is sufficient to keep the entire chain of slide units in movement. The drive unit (50) can, for example, be constructed in the type of a toothed wheel, the teeth of which engage laterally in the path of the slide unit, and move this further on to the driving tongue units (49). It can likewise be provided for such types of toothed wheels to engage still further within the path, and directly move the slide units further forward.

Rotational devices, which rotate the mandrels (47), with the plastic molding blanks (1) placed on them, around the longitudinal axis (61 or 59) during their path through the tempering station (11), are not depicted in FIG. 1. Stationary toothed racks which engage, on one side, with the path of the slide unit, and which cooperate with the driving tongue units (49) in order to thereby bring about a rotation of the mandrel if the slide unit (44) moves past the stationary toothed racks, can be used as rotation devices. Laterally-engaging friction wheels, friction straps or friction rails which engage with the holding devices are likewise possible.

In the area between the intake star unit (25) to the blowing wheel (13) and up to the transfer wheel (15), the shuttle system (43) rises, along with its rails (18), from the lower level of the intake star unit (25) to above the level of the tempering station (11). Within this area, the shuttle units are moved upwardly by means of an additional driving device (50).

By means of this machine, work can now be carried out as follows. The plastic molding blanks (1) are transferred, in the known manner, from the conveying wheel (39) to the conveying chute (37). The conveying chute (37) is inclined in such a manner that the series of plastic molding blanks (1) slides down, by means of gravity, in the direction of the transfer wheel (15). The plastic molding blanks are individually taken over there on their collars (5), suspended from the accommodation pockets (35) of the transfer wheel (15) through the rotation of the same in the direction of the arrow, and thereby brought to the distance of the mandrel (47). The transfer wheel (15) transports the molding blanks (1) to the first transfer area (29).

The slide units (44) of the shuttle system approach this transfer area from above, whereby the mandrels (47) are oriented in a downward direction. The limit stops (51) of the spacing links (53), which bring about a shortening of the distance (63), are grasped there. The mandrel (47) therefore retracts, upon the movement through the first transfer area (29), into the direction of the cage (17). The spacing link (53) proceeds in such a manner that the distance (63) is enlarged again at a point within the transfer area (29) at which the slide unit (44) is located directly above the aperture (7) of a plastic molding blank (1), which is suspended within an accommodation pocket (35) of the transfer wheel (15). The mandrel (47) is, in this manner, inserted into the molding blank (1). The circumference of the mandrel (47) is—through the use an elastic washer, if necessary—adjusted to the internal diameter of a molding blank, in such a manner that a tight clamping can take place. After taking over a molding blank (1), the slide unit (44) moves into the twisting area (19). Here, the guide rails (18) or the cage (17) are twisted in such a manner that the slide units (44) are placed upside down. By that means, the plastic molding blanks (1) are brought from a position in which their apertures (7) point upwardly into a position in which their apertures point downwardly. In this position, the molding blanks pass through the tempering station (11) in the direction of the arrow, whereby they are brought to the temperature which is necessary for the subsequently following extension blowing process.

During their path through the tempering station (11), the holding devices of the slide units are rotated, along with the plastic molding blanks (1), around the axis of rotation (61) or the longitudinal axis (59). By means of this rotation, a uniform heating of the plastic molding blank is ensured by the heating devices (23), such as infrared radiating device, for example, which are positioned along the path of the slide units through the tempering station (11). The blowing units (24), which are positioned between the heating devices (23), serve for the purpose that the external area of the plastic molding blanks (1) is not overheated.

Within the combined height transfer and turning area (21), downstream from the tempering station (11), the slide units (44) are lowered to a level which lies below the tempering station (11) and are, in addition, simultaneously brought out of the position in which the apertures (7) point downwardly into a position in which the apertures (7) point upwardly again. This is brought about by the fact that the arc in the turning area (21) points downwardly (into the level of the diagram). This arc lies in a vertical level (perpendicular to the plane of the diagram), and comprises a circular arc of approximately 180 degrees. After that, the slide units enter into a second transfer area (31), in which a spacing link, which corresponds to the spacing link (53) of FIG. 2, is located. The mandrel (47) is retracted again after the plastic molding blanks (1) are brought into engagement with the accommodation pockets of the intake star unit (25), which is equipped with a gripping unit, which intake star unit brings the plastic molding blanks to that spacing distance which is necessary for the next-following blowing process. The slide units which are emptied in this manner then arrive at the drive unit (50), which moves it, in direct succession, along the arc-shaped incline (41), in an upward direction. The heated plastic molding blanks, which are transported into the accommodation pockets of the intake star unit (25), are transferred to the blowing wheel (13), where they inflate, in the known manner, into the definitive shape of a plastic bottle. After the extension blowing process, the bottles are then transferred to the discharge wheel (27) and transported away for further processing.

In deviation from the form of implementation which has been described, it is also possible to dispense with the intake star unit (25) and to continue the shuttle system up to the blowing wheel, or even through the blowing station. The latter is partially indicated by dotted lines.

In the construction of the slide unit which has been depicted, the receiving mandrel is, to be sure, rotatable, but is connected with the slide unit in a non-detachable manner. In one variation from this construction, the molding blanks (1) could also be transferred to mandrels which are connected with the slide units by means of carriers which can be connected or disconnected. To pass through the blowing station, the carriers with the molding blanks can then be disconnected from the shuttle system and then connected again behind the blowing station.

The arrangement of the tempering station and of the extension blowing station in two different levels makes a very compact manner of construction possible. If such a two-level arrangement is not provided, then a second twisting area, which resembles the twisting area (19) and which serves, in turn, for the change of the orientation of the plastic molding blanks within the space, is provided, instead of the combined height transfer and turning area (21).

I claim:

1. A device for the manufacture of hollow plastic bodies comprising a transport device to help guide plastic molding blanks (1) by a transfer station (29) through a tempering station to an extension blowing station, said transport device comprising at least one guide rail (17, 18) forming a stationary closed loop path, discrete slide units (44) with holding devices for plastic molding blanks (1) slideable individually within and supported by said at least one guide rail, a drive unit adapted to push the discrete slide units along the at least one guide rail, and a first twisting area of said at least one guide rail (17, 18), whereby at least one change of orientation of the spatial position of the plastic molding blanks is carried out by means of the first twisting area of the at least one guide rail.

2. A device in accordance with claim 1, wherein said first twisting area (19) is located between said transfer station

(29) and said tempering station (11), said at least one guide rail (17, 18) is twisted in such a manner that said slide units (44) are brought out of a spatial orientation in which they transport the plastic molding blanks with their apertures (7) directed upwardly into a spatial orientation in which they transport the plastic molding blanks (1) with their apertures (7) directed downwardly.

3. A device in accordance with claim 1 or 2, and a second twisting area (21), located immediately after said tempering station (11), in which said at least one guide rail (17, 18) is twisted in such a manner to bring said slide units (44) from a spatial orientation in which they transport the plastic molding blanks (1) with their apertures (7) directed downwardly into a spatial expansion in which they transport the plastic molding blanks (1) with their apertures (7) directed upwardly.

4. A device in accordance with claim 1, wherein said at least one guide rail (17, 18) is arranged in said tempering station (11) in such a manner that the plastic molding blanks (1) are transported by said slide units (44) with their apertures (7) directed downwardly.

5. A device in accordance with claim 1 and a transfer wheel (15), having accommodation pockets (35) positioned on the circumference, for the transfer of the plastic molding blanks (1) from one conveying unit (37) to said slide units (44), whereby said transfer wheel (15) is positioned in front of said tempering station (11).

6. A device in accordance with claim 1, 2, 4, or 5, wherein said at least one guide rail (17, 18) proceeds through said extension blowing station.

7. A device in accordance with claim 1, and a blowing wheel (13) in said extension blowing station, which supports the plastic molding blanks (1) while these are extension-blown into their definitive shape.

8. A device in accordance with claim 7, and an intake star unit (25) with accommodation pockets, said star unit (25) operable to transfer the plastic molding blanks (1) from said slide units (44) to said blowing wheel (13).

9. A device in accordance with claim 1, wherein said extension blowing station is positioned in another level than said tempering station (11).

10. A device in accordance with claim 9, and a transfer area (21) between said tempering station (11) and said extension blowing station, in which said at least one guide rail (17, 18) is curved in such a manner that said slide units (44) are, upon the transport of the plastic molding blanks (1), moved from the level of said tempering station (11) into the level of said extension blowing station.

11. A device in accordance with claim 1, further comprising a plurality of drive units for the driving of said slide units (44) along said at least one guide rail (17, 18).

12. A device in accordance with claim 1, wherein said drive unit comprises tongue units (49) on said slide units (44), and a driving device (50) which can engage said tongue units (49) in such a manner that said slide units (44) are moved along said at least one guide rail (17, 18).

13. A device in accordance with claim 1, wherein said holding devices each comprise a mandrel (47) which is adjusted in such a manner that it holds the plastic molding blanks (1) in their apertures (7) by means of friction engagement.

14. A device in accordance with claim 1, wherein said holding devices are supported, in a rotatable manner, on said slide units (44), each around an axis of rotation (61) which is perpendicular to said at least one guide rail (17, 18), for the rotatable support of the plastic molding blanks (1) around their longitudinal axis (59).

15. A device in accordance with claim 14, and a rotation device with at least one stationary tongue unit which engages, from one side, with the path which a portion of the holding devices of said slide units (44) follow during the passing through of said tempering station (11).

16. A device in accordance with claim 1, wherein said holding devices are movably supported on said slide units (44) in such a manner that their distance (63) to said at least one guide rail (17, 18) is changeable.

17. A device in accordance with claim 16, wherein the holding devices and the slide units (44) are each connected with one another in an elastic manner.

18. A device in accordance with claim 16, wherein the holding devices comprise limit stops (51) which cooperate with at least one stationary spacing link (53) during the movement of the slide units (44) along the at least one guide rail (17, 18), in order to change the distance (63) of the holding devices from the at least one guide rail (17, 18).

19. A device in accordance with claim 13, wherein the transfer station (29) comprises a spacing link (53) which is configured in such a manner that it reduces the distance (63) of the mandrels (47) from the at least one guide rail (17, 18) before the transfer of the plastic molding blanks (1) to the slide units (44), and increases the distance (63) of the mandrels (47) from the at least one guide rail (17, 18) during the transfer in such a manner that the mandrels (47) engage the holding devices in the apertures (7) of the plastic molding blanks to be transferred.

20. A device in accordance with claim 1, wherein the hollow plastic bodies are plastic bottles.

21. A device in accordance with claim 17, wherein the holding devices (47) comprise limit stops (51) which cooperate with at least one stationary spacing link (53) during the movement of the slide units (44) along the guide rail (17, 18), in order to change the distance (63) of the holding devices (47) from the guide rail (17, 18).

22. A device in accordance with claim 18, wherein the spacing link (53) is configured in such a manner that it reduces the distance (63) of the holding devices from the at least one guide rail (17, 18) before the transfer of the plastic molding blanks (1) to the slide units (44), and increases the distance (63) of the holding devices from the at least one guide rail (17, 18) during the transfer in such a manner that the holding devices engage in the apertures (7) of the plastic molding blanks to be transferred.

* * * * *